United States Patent [19]
Franklin et al.

[11] 3,879,168
[45] Apr. 22, 1975

[54] MANUFACTURE OF ALGINIC MATERIAL

[75] Inventors: Kenneth John Franklin, Harrow; Keith Bates, Pinner, both of England

[73] Assignee: Medical Alginates Limited, Perivale, Middlesex, England

[22] Filed: Feb. 20, 1973

[21] Appl. No.: 333,991

Related U.S. Application Data

[62] Division of Ser. No. 203,039, Nov. 29, 1971.

[52] U.S. Cl. ............................ 8/115.5; 8/101; 8/108; 8/125; 128/156
[51] Int. Cl. ............................................. D06c 27/00
[58] Field of Search ............ 8/115.5, 101, 108, 125; 128/156

[56] References Cited
UNITED STATES PATENTS

| | | | |
|---|---|---|---|
| 2,409,319 | 10/1946 | Speakman et al. | 8/115.5 |
| 2,513,416 | 7/1950 | Le Gloahec | 8/115.5 X |
| 2,536,893 | 1/1951 | Speakman et al. | 8/115.5 |
| 2,584,508 | 2/1952 | Speakman et al. | 8/115.5 X |

*Primary Examiner*—Stephen J. Lechert, Jr.
*Attorney, Agent, or Firm*—Henry K. Leonard

[57] ABSTRACT

Partially soluble alginic material in the form of gauze or wool, suitable for the preparation of surgical dressings, based on alginic acid and containing calcium, sodium and acid forms e.g. in the ratio 4 : 5 : 1 and characterised by a calcium content of 2 to 6 percent and a reaction pH of 4 to 7 and a method of manufacture by treatment of the insoluble calcium form of the material with a predetermined quantity of acid and, thereafter, alcoholic alkali.

13 Claims, No Drawings

MANUFACTURE OF ALGINIC MATERIAL

This is a divisional of application Ser. No. 203,039, filed Nov. 29, 1971.

FIELD OF THE INVENTION

The present invention relates to alginic material more particularly in the form of gauze or wool suitable for the preparation of surgical dressings and to a method for its preparation.

DESCRIPTION OF THE PRIOR ART

The use of calcium and sodium alginate materials made up into wool, gauze and the like in surgery and in the dressing of wounds is now well known. Its use was first described in detail by George Blaine in Annals of Surgery of January 1947. Methods of preparation have been described in British Pat. No. 653,341 and 1,231,506.

Algin is a material obtained from seaweed. It can be converted into an acid form known as alginic acid which is insoluble and salts of alginic acid can be obtained some of which are soluble and some insoluble in water and body fluids. Thus calcium alginate is insoluble where sodium alginate is soluble so that by spinning a solution of sodium alginate into a calcium containing medium, fibres of calcium alginate can be obtained which may be woven or knitted into fabric or gauze. Calcium alginate gauze is not readily soluble in body tissues and to provide a material having optimum properties for use in surgery and in the dressing of wounds it is necessary to bring the calcium content of the gauze down to an amount generally about 4 percent or within the range 3 to 5 percent by weight, replacing at least part of the calcium by a soluble cation of which sodium is the most common. However useful products can have 2.6 percent Ca.

British patent specification No. 653,341 describes essentially two related methods for producing alginic gauze having the necessary properties described above. In the first modification calcium alginate gauze is leached with acid such as hydrochloric or acetic acid until it is free from calcium ions. It is then immersed in an aqueous alcoholic solution of calcium acetate or calcium chloride containing a known weight of calcium ions and this alcoholic solution is then titrated to neutrality (pH 7) with an alkali such as sodium hydroxide using an appropriate indicator and drained and dried.

In the modification of the process described in British patent specification No. 653,341 the calcium alginate wool or gauze is immersed in dilute hydrochloric or acetic acid solution such that the amount of acid is not sufficient to leach out more than a predetermined percentage of the calcium. The material is then washed free from calcium chloride or acetate and finished by titration as above described.

Due to the amount of time taken in bringing the heterogeneous system of gauze and solution into equilibrium, a titration technique is very time consuming and for this reason efforts have been made to improve upon the process.

In British patent specification No. 1,231,506 a modified process is described in which the first step of acid replacement is the same but the titration step is replaced by the addition to the alcohol vehicle containing the gauze of an excess of sodium hydroxide or other alkali over the calculated stoichiometric quantity of alkali equivalent to the acid used. Excess sodium hydroxide is washed away with more alcohol containing some weak acid. The product obtained by the process described in British patent specification No. 1,231,506 essentially contains no hydrogen ions on the alginate matrix and will therefore react with a pH in excess of 7.

THE PROBLEM

If all of the calcium removed to bring the content to the range 2 to 6 percent is replaced by sodium, the resultant product will have a slightly alkaline reaction in contact with water. We have found that gauzes providing an alkaline reaction are more subject to discolouration upon sterilization. This is a problem to which alginic gauzes are particularly prone and which can be a serious commercial disadvantage. We have found that the optimum reaction pH for the alginic gauze i.e. the pH obtained when the gauze is immersed in water is within the range 5 to 6, but gauzes and other alginic products within the scope of the invention may have a pH within the range 4 to 7.

In order to produce an alginic product reacting with a pH within the range 4 to 7 and having the necessary properties of haemostasis and dispersion within the body and gelling in contact with the wound, the alginate matrix must contain calcium ions (or equivalent insoluble cations) sodium ions (or equivalent soluble cations) and hydrogen ions in a balanced proportion.

THE INVENTION

Therefore according to one aspect of our invention we provide, as a product of manufacture, a partially soluble alginic material in the form of gauze or wool suitable for the preparation of surgical dressings characterised by a reaction pH of 4 to 7 and a calcium content of 2 to 6 percent (preferably 3 to 5 percent) by weight.

Our invention includes a surgical dressing comprising a product as defined above, in sterile form.

The present invention is also directed at the problem of devising an economic process for producing an alginic product suitable for the preparation of surgical dressings and reacting at a pH within the range of 4 to 7, preferably 5 to 6.

In the process of the present invention the calcium alginate raw material is submitted to acid treatment, e.g., as previously proposed, to remove the desired quantity of calcium so as to leave a product having a calcium content of 2 to 6 percent by weight. After washing and removal of excess liquid as necessary or desired, the product is immersed in or otherwise treated with an alcoholic solution of an alkali. In the preferred process the quantity of alkali is that found by trial and error to neutralise sufficient of the free alginic acid to cause the resulting product to react at a pH within the desired range i.e., 4 to 7, or preferably 5 to 6, or at least approximately within this range. This weight of alkali will not be the stoichiometric weight calculated to replace all of the hydrogen ion from the matrix but a lower amount. After any necessary agitation, a measure is obtained of the reaction pH of the product. We have found that it is convenient to test the pH of the mother liquor for this purpose. The pH of the mother liquor can then be adjusted by the addition of acid or alkali as necessary to bring it, and consequently the reaction pH of the gauze or wool within the desired range. The pH of the gauze is preferably checked when the mother liquor has the desired pH, e.g., by extract ing a sample, rinsing briefly in alcohol and immersing it in water containing an indicator or pH meter. The mother liquor is then removed and the final wash is preferably then made with a fresh neutral alcoholic solution.

It is however novel and within the broad compass of the invention to add more than the quantity of alkali calculated to produce a pH reaction in the gauze of 4 to 7. Adjustment is then made by adding incremental quantities of acid to the alcoholic solution to bring the pH within the desired range. If a test of the material shows addition of alkali in excess of the preferred quantity, the mother liquor can be removed and the product washed and agitated with a solution of a weak acid e.g., with acetic acid until the pH of a test portion is brought to the desired range. In this case further washing with unacidified alcoholic solution is not necessary although it may be carried out if desired. However addition of acid can normally be avoided and should preferably be avoided as introducing organic contaminants.

Thus the alkali originally added may be determined by calculation or calibration by trials to bring the mother liquor to the acid end of the desired range.

It is preferred to use a weak acid such as acetic acid to adjust the pH or for final washing. The preferred acid for the main calcium replacement reaction is hydrochloric although sulphuric or phosphoric may be used.

Another important feature of the invention which may be considered as an independent aspect of the invention or as a preferred feature, lies in the washing and bleaching procedure used for the alginate wool or gauze prior to the conversion process above described. The raw material normally obtained from the spinners and knitters is discoloured and frequently contains considerable oily residues. It is therefore normally necessary to clean and purify the raw material before conversion. This is carried out by washing the raw material in a mixture of detergent and bleach. It is preferred to add some calcium chloride to the wash liquid to prevent premature replacement of some of the calcium by sodium and so upsetting the calculated balance of ions in the final product. For the same reason it is preferred to use deionized water in the washing liquid. It has been found that when the washing is completed it is very difficult to rid the matrix of all traces of bleach, normally sodium hypochlorite. Where the material is to be used in surgery it is most desirable to remove all traces of the bleach and it is normally necessary to carry out prolonged rinsing for this purpose. We have found that the last traces of bleach may be readily removed by treatment with a dilute solution of a suitable non-toxic reducing agent preferably an inorganic reducing agent such as sodium thiosulphate. Preferably a 0.05 percent solution of sodium thiosulphate is used and the treatment is carried out after the final rinse, the product being given a final rinse afterwards.

The following Example illustrates the preferred process of the invention.

EXAMPLE

Cleaning and Purification 4.00 kg calcium alginate staple fibre or knit is weighed into a stainless steel horizontal drum washing machine and the following ingredients are added:

| | |
|---|---|
| Detergent solution (Sipex) T53) | 400 ml. |
| Sodium hypochlorite solution (approximately 10% available chlorine) | 300 ml. |
| Calcium chloride | 600 g. |
| Deionized water | 100 l. |

The detergent solution, sodium hypochlorite and calcium chloride are dissolved in the deionized water and added to the washing machine which is turned on. The machine carries out a washing procedure with agitation for 20 minutes at about 30°C until the calcium alginate is fully bleached. The washing machine is then operated to remove the wash solution. The machine is filled, agitated and drained three times each with 100 l. of deionized water. It is then refilled with 100 l. of deionized water into which is dissolved 50 g. of sodium thiosulphate. A washing operation is carried out for five minutes and a sample of fibre is tested for a negative starch/iodine reaction. On obtaining a negative test the solution is drained and the product rinsed finally with 100 l. of deionized water.

Calcium Reduction Process

The washing machine is then filled with 100 l. of deionized water and with agitation, 840 ml. of hydrochloric acid B.P., diluted with 1 l. of deionized water, is added. Washing operation with agitation is continued for 30 minutes after which the residual liquid is drained. The material in the washing machine is then rinsed with successive aliquots of 100 l. of deionized water until a negative chloride test is obtained. Centrifugal spinning is carried out to remove excess liquor.

Neutralisation Process

The material after centrifugal spinning is transferred to a second stainless steel horizontal drum washing machine in which it is suspended in 70 l. of industrial methylated spirits (95 percent T.G.). While the product is being agitated slowly, a sufficient amount of concentrated sodium hydroxide solution is added to bring the pH of the liquor, after establishment of equilibrium, to 5.5 ± 0.5. This amount will be an amount slightly less than the stoichiometric quantity as calculated for example in the formula given in British patent specification No. 1,231,506. The pH of the material is adjusted if necessary to 5.5 ± 0.5 by adding increments of concentrated sodium hydroxide solution or of acetic acid. When the pH is correct the alcoholic solution is removed by centrifugal spinning and the product is rinsed with 70 l. of 95 percent T.G. industrial methylated spirits. The supernatant liquid is again removed by centrifugal spinning and the product dried, e.g., in a tumbler drier.

An important preferred feature of the calcium reduction step is in the manner in which the acid is added. In order to obtain a uniform calcium content over the whole of the sample, it is necessary for the acid to be thoroughly dispersed. It has been found that to immerse the sample in ready-mixed dilute acid does not result in uniform action of the acid over the whole of the sample. Similarly, too rapid an addition of strong acid to the water in which the sample is contained will give rise to non-uniform action. The machine preferably used has a horizontal drum and the acid, in its described relatively concentrated form, is passed through a perforated tube extending along the length of the drum so as to distribute the acid over the horizontal dimension of the machine. At the same time the acid is added slowly over a period of time, for example 10 minutes or more broadly from 5 to 15 minutes.

It will be appreciated that the calcium alginate staple fibre or knit added at the beginning of the cleaning and purification step contains moisture and about 10 percent of oils in addition to calcium alginate. Since it is normally inconvenient to dry and weigh the material after cleaning and purification, calculations are normally based upon the impure product. This will contain a varying proportion of calcium normally between 7 and 8 percent, depending upon the amount of impurity. For this reason, theoretical calculations of the quantity of acid and alkali to be used are at best imperfect. Furthermore the theoretical calculation which was, for example, provided in British patent specification No. 1,231,506, is only an approximation since it assumes an irreversible reaction.

The quantity of alkali, and indeed acid, used may if desired be adjusted in accordance with the calcium content of the raw material and will of course be different for a different weight of material. The sodium hydroxide is for convenience added in the same volume as the acid and for 4 kilos of calcium alginate raw material having a calcium content of 8 percent by weight, 840 ml. of 27 percent w/v NaOH will normally bring the pH of the material within the correct pH range (840 ml. of B.P. hydrochloric acid having been used in the reduction step). The stoichiometric amount of sodium hydroxide equivalent to the acid would be 840 ml. of about 40 percent w/v NaOH so that considerably less than this amount is used. However, it must be borne in mind that not all of the acid used actually replaces calcium due to the back reaction forming part of the equilibrium process and also due possibly to incomplete reaction under practical conditions. For these reasons, theoretical calculation of the exact amounts to be used is of limited value and calibration from experimental trials is more satisfactory. Normally the resultant product having a pH of 5.5, as determined by analysis, will contain calcium alginate, sodium alginate and alginic acid in approximately the ratio 4 : 5 : 1.

What we calim is:

1. A method of preparing partially soluble alginic material in the form of gauze or wool suitable for the preparation of surgical dressings and having an alginic acid substrate partially neutralized by calcium and an alkali metal giving a calcium content within the range 2 to 6 percent by weight and a reaction pH within the range of about 4 to slightly less than 7 comprising the steps of:
subjecting a calcium form of the alginic material to a treatment with acid predetermined to replace part of the calcium yielding a product having a calcium content of 2 to 6 percent by weight and subsequently to a treatment with an alcoholic solution of an alkali selected from the group consisting of sodium and potassium hydroxide predetermined to neutralize sufficient of the alginic acid to provide a product having a reaction pH approximately within the desired range of about 4 to slightly less than 7,
obtaining a measure of the reaction pH of the resulting product, and
as and if necessary, adding acid or alkali to said alcoholic alkali in contact with the product in increments until a measure of the reaction pH indicates a value of reaction pH within the range of about 4 to slightly less than 7.

2. A method as claimed in claim 1 wherein the said pH range is from 5 to 6.

3. A method as claimed in claim 1 wherein the measure of the reaction pH of the said product in contact with alcoholic hydroxide solution is obtained by testing the pH of the mother liquor.

4. A method as claimed in claim 1 wherein the said acid treatment is effected by immersing and agitating the alginic material in a predetermined quantity of water in a container and slowly adding to the container at distributed points a predetermined quantity of a concentrated acid selected from the group consisting of hydrochloric, sulphuric and phosphoric acids.

5. A method as claimed in claim 4 wherein the said container is a horizontal drum washing machine and the said concentrated acid is delivered at points distributed over substantially the axial dimension of the drum.

6. A method as claimed in claim 5 wherein the said concentrated acid is hydrochloric acid.

7. A method as claimed in claim 1 wherein, prior to said neutralisation with acid, the said calcium form of alginic material is treated with an aqueous solution containing detergent and bleach, rinsed and the last traces of bleach removed with a reducing agent.

8. A method as claimed in claim 7 wherein the reducing agent comprises sodium thiosulphate.

9. A method as claimed in claim 7 wherein the alginic material is rinsed after treatment with reducing agent and the fibre tested to ensure complete removal of remaining reducing agent.

10. A method as claimed in claim 7, wherein said detergent and bleach solution contains added calcium ions.

11. A method as claimed in claim 10 wherein after said acid treatment and prior to said treatment with alcoholic hydroxide the alginic material is rinsed with deionised water until a negative chloride test is obtained.

12. A method of preparing partially soluble alginic material in the form of gauze or wool suitable for the preparation of surgical dressings and having an alginic acid substrate partially neutralized by calcium and an alkali metal giving a calcium content within the range 2 to 6 percent by weight and a reaction pH within the range of about 4 to slightly less than 7 comprising the steps of:
subjecting a calcium form of the alginic material to a treatment with acid predetermined to replace part of the calcium yielding a product having a calcium content of 2 to 6 percent by weight and subsequently to a treatment with an alcoholic solution of an alkali selected from the group consisting of sodium and potassium hydroxide predetermined to neutralize slightly less than sufficient of the alginic acid to provide a product having a reaction pH approximately within the desired range of about 4 to slightly less than 7,
testing the pH of the alcoholic hydroxide solution in contact with the alginic material,
and adding incremental quantities of further alkali until the said alcoholic hydroxide solution is at a pH within the range of about 4 to slightly less than 7.

13. A method of preparing partially soluble alginic material in the form of gauze or wool suitable for the preparation of surgical dressings and having an alginic acid substrate partially neutralized by calcium and an alkali metal giving a calcium content within the range 2 to 6 percent by weight and a reaction pH within the range of about 4 to slightly less than 7 comprising the steps of:

subjecting a calcium form of the alginic material to a treatment with acid predetermined to replace part of the calcium yielding a product having a calcium content of 2 to 6 percent by weight and subsequently to a treatment with an alcoholic solution of an alkali selected from the group consisting of sodium and potassium hydroxide predetermined to neutralize slightly more than sufficient to the alginic acid to provide a product having a reaction pH approximately within the desired range of about 4 to slightly less than 7, testing the pH of the alcoholic hydroxide solution in contact with the alginic material, and adding incremental quantities of a weak, non-toxic, organic acid until the said alcoholic hydroxide solution is at a pH within the range of about 4 to slightly less than 7.

* * * * *